(12) United States Patent  
Balmakhtar et al.

(10) Patent No.: US 12,388,726 B2
(45) Date of Patent: Aug. 12, 2025

(54) SYNCHRONIZED WIRELESS NETWORK SLICING

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 66 days.

(21) Appl. No.: 18/520,004

(22) Filed: Nov. 27, 2023

(65) Prior Publication Data

US 2025/0175399 A1    May 29, 2025

(51) Int. Cl.
| | |
|---|---|
| *G06F 15/173* | (2006.01) |
| *H04L 5/00* | (2006.01) |
| *H04L 41/40* | (2022.01) |
| *H04L 41/5041* | (2022.01) |
| *H04W 12/06* | (2021.01) |

(52) U.S. Cl.
CPC ........ *H04L 41/5041* (2013.01); *H04L 5/0053* (2013.01); *H04L 41/40* (2022.05); *H04W 12/06* (2013.01)

(58) Field of Classification Search
CPC ... H04L 41/5041; H04L 5/0053; H04L 41/40; H04W 12/06
See application file for complete search history.

(56) References Cited

U.S. PATENT DOCUMENTS

| | | | |
|---|---|---|---|
| 6,876,652 B1 | 4/2005 | Bell et al. | |
| 10,791,040 B2* | 9/2020 | Vrzic | H04W 16/02 |
| 10,791,509 B2 | 9/2020 | Qiao et al. | |
| 11,115,267 B2 | 9/2021 | Liu et al. | |
| 11,405,122 B2 | 8/2022 | Wang et al. | |
| 11,570,730 B2 | 1/2023 | Yu et al. | |
| 11,805,463 B2* | 10/2023 | Thantharate | H04W 36/0016 |
| 2020/0204444 A1 | 6/2020 | Marquardt et al. | |
| 2020/0275281 A1* | 8/2020 | Bordeleau | H04W 36/12 |
| 2021/0091994 A1 | 3/2021 | Meirosu et al. | |
| 2022/0417729 A1* | 12/2022 | Cai | H04W 8/205 |

* cited by examiner

*Primary Examiner* — John B Walsh

(57) ABSTRACT

A first wireless network slice executes a first slice input and generates a first slice output. The first slice transfers the first slice output to a second wireless network slice. The second slice receives and authorizes the first slice output and transfers a first acknowledgement to the first slice. The first slice receives the first acknowledgement and responsively uses the first slice output to deliver a data communication service. The second slice executes a second slice input and generates a second slice output. The second slice transfers the second slice output to the first slice. The first slice receives and authorizes the second slice output and transfers a second acknowledgement to the second slice. The second slice receives the second acknowledgement and responsively uses the second slice output to deliver the data communication service.

20 Claims, 11 Drawing Sheets

SYNCHRONIZED WIRELESS NETWORK SLICING

TECHNICAL BACKGROUND

Wireless communication networks provide wireless data services to wireless communication devices like phones, computers, and other user devices. The wireless data services may include internet-access, data messaging, video conferencing, or some other data communication product. The wireless communication networks comprise wireless access nodes like Wireless Fidelity (WIFI) hotspots and Fifth Generation New Radio (5GNR) cell towers. The wireless communication networks also comprise wireless network slices. The wireless network slices have customized software that is tailored for their specific wireless data services. For example, an augmented reality device may use an Ultra-Reliable Low Latency Communication (URLLC) slice while a television device may use an enhanced Mobile Broadband (eMBB) slice.

The typical wireless network slice comprises software that executes in a data center to form Virtual Network Functions (VNFs) that transfer user data and/or control the transfer of the user data. Exemplary VNFs that are used to form wireless network slices include User Plane Functions (UPFs) and Policy Control Functions (PCFs). Exemplary data centers include Network Function Virtualization Infrastructures (NFVIs) and Management and Orchestration (MANO) systems. The MANO systems implement Network Service Descriptors (NSDs) that have Virtual Network Function Forwarding Graphs (VNF-FGs). The VNF-NFGs specify Virtual Network Function Network Forwarding Paths (VNF-NFPs) between the VNFs. The VNFs uses the VNF-NFPs to communicate and deliver the data communication services described in the applicable NSDs.

Distributed ledgers have multiple ledger nodes that perform ledger transactions in parallel. The ledger nodes validate a transaction when a consensus is reached among the nodes for the ledger transaction. The typical ledger transaction entails a smart contract that processes a data input to generate a data output. For example, a ledger may process the data inputs of a current balance and an expenditure to generate the data output of a new balance. The distributed ledger nodes each store transaction data in data blocks that also include a hash of the previous data block. Thus, the data blocks are linked by the hashes and the transaction data is immutable.

Unfortunately, the wireless communication networks do not effectively coordinate the parallel operations of different network slices. Moreover, the wireless communication networks fail to efficiently use NSDs and distributed ledgers to synchronize the parallel operations of the different network slices. As a result, the unsynchronized delivery of the data communication services to the wireless user devices suffers or fails.

Technical Overview

In some examples, a data communication service uses synchronized wireless network slicing. A first wireless network slice executes a first slice input, and in response, generates a first slice output to deliver the data communication service. The first slice transfers the first slice output to a second wireless network slice. The second wireless network slice receives and authorizes the first slice output, and in response, transfers a first acknowledgement to the first wireless network slice. The first wireless network slice receives the first acknowledgement, and in response, uses the first slice output to deliver the data communication service. The second wireless network slice executes a second slice input, and in response, generates a second slice output to deliver the data communication service. The second slice transfers the second slice output to the first wireless network slice. The first wireless network slice receives and authorizes the second slice output, and in response, transfers a second acknowledgement to the second wireless network slice. The second wireless network slice receives the second acknowledgement, and in response, uses the second slice output to deliver the data communication service.

In some examples, a Network Function Virtualization Infrastructure (NFVI) delivers a data communication service using wireless network slicing. A first Wireless Network Slice Virtual Network Function (WNS-VNF) executes a first slice input, and in response, generates a first slice output to deliver the data communication service. The first WNS-VNF transfers the first slice output to a second WNS-VNF over an NFVI-Virtual Layer (VL). The second WNS-VNF receives and authorizes the first slice output, and in response, transfers a first acknowledgement to the first WNS-VNF over the NFVI-VL. The first WNS-VNF receives the first acknowledgement, and in response, uses the first slice output to deliver the data communication service. The second WNS-VNF executes a second slice input, and in response, generates a second slice output to deliver the data communication service. The second WNS-VNF transfers the second slice output to the first WNS-VNF over the NFVI-VL. The first WNS-VNF receives and authorizes the second slice output, and in response, transfers a second acknowledgement to the second WNS-VNF over the NFVI-VL. The second WNS-VNF receives the second acknowledgement, and in response, uses the second slice output to deliver the data communication service.

DETAILED DESCRIPTION

Figure 1:
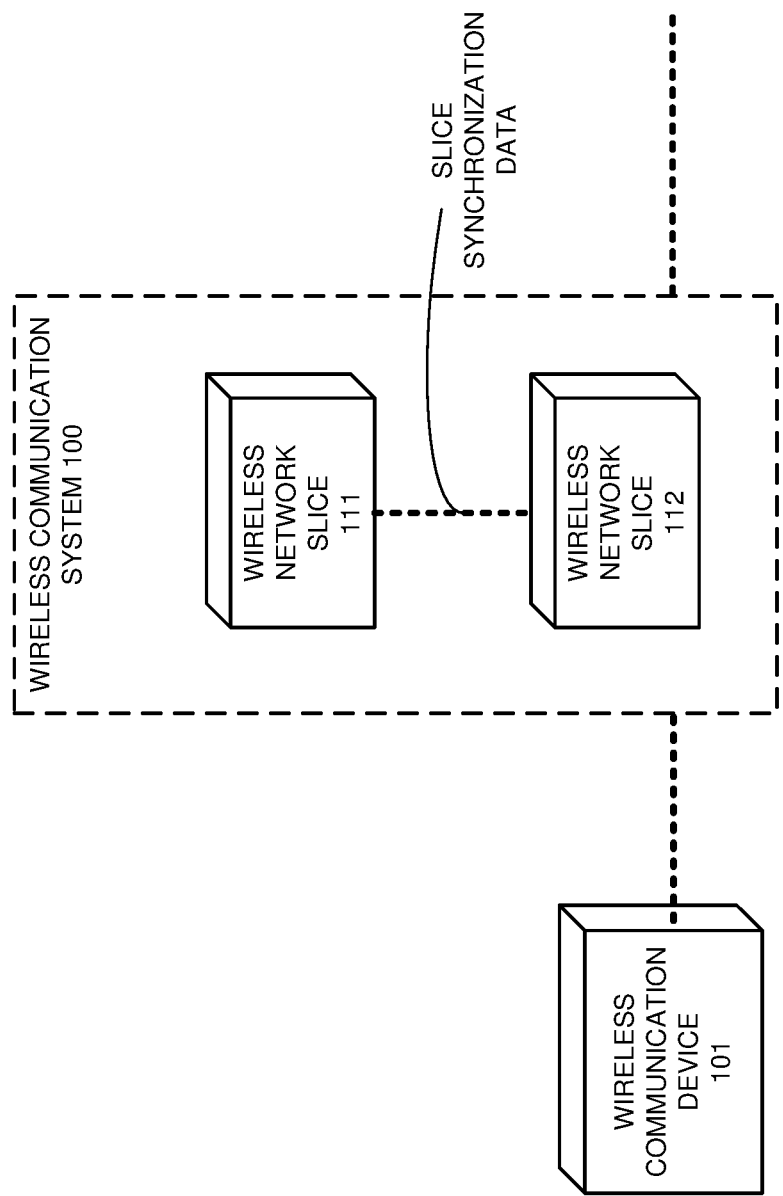
FIG. 1 illustrates an exemplary wireless communication system to deliver a data communication service using synchronized wireless network slices.

FIG. 1 illustrates exemplary wireless communication system 100 to deliver a data communication service using synchronized wireless network slices 111-112. Wireless communication system 100 comprises wireless network slices 111-112 that deliver the data communication service to wireless communication device 101. Wireless communication device 101 comprises a phone, computer, vehicle, sensor, or some other user communication apparatus. The data communication service comprises internet-access, data messaging, media conferencing, or some other data communications product. The amount of wireless communication devices and wireless network slices that are shown in FIG. 1 has been restricted for clarity.

In some examples, wireless network slice 111 executes a first slice input, and in response, generates a first slice output to deliver the data communication service. The first slice input and the first slice output comprise user identifiers, user services, quality-of service levels, service usage information, digital certificates, or some other data that is generated and/or consumed by wireless network slices 111-112. Wireless network slice 111 transfers the first slice output to wireless network slice 112. Wireless network slice 112 receives and authorizes the first slice output, and in response, transfers a first acknowledgement to wireless network slice 111. Wireless network slice 112 may perform the authorization based on a data structure of allowed and/or disallowed outputs, successful receipt, current status, authorization script, artificial intelligence, certificate validation, or some other technique. Wireless network slice 111 receives the first acknowledgement, and in response, uses the first slice output to deliver the data communication service to wireless communication device 101. Wireless network slice 111 will not use the first slice output to deliver the data communication service to wireless communication device 101 without the first acknowledgement and may take some remedial action instead.

Wireless network slice 112 executes a second slice input, and in response, generates a second slice output to deliver the data communication service. The second slice input and the second slice output comprise user identifiers, user services, quality-of service levels, service usage information, digital certificates, or some other data that is generated and/or consumed by wireless network slices 111-112. Wireless network slice 112 transfers the second slice output to wireless network slice 111. Wireless network slice 111 receives and authorizes the second slice output, and in response, transfers a second acknowledgement to wireless network slice 112. Wireless network slice 111 may perform the authorization based on a data structure of allowed and/or disallowed outputs, successful receipt, current status, authorization script, artificial intelligence, certificate validation, or some other technique. Wireless network slice 112 receives the second acknowledgement, and in response, uses the second slice output to deliver the data communication service. Wireless network slice 112 will not use the second slice output to deliver the data communication service to wireless communication device 101 without the second acknowledgement and may take some remedial action instead. The first slice output and the second slice input may be the same.

In some examples, wireless network slice 111 transfers the first slice input to wireless network slice 112 along with the first slice output. Wireless network slice 112 receives and authorizes the first slice input along with the first slice output. Wireless network slice 112 transfers the first acknowledgement to the wireless network slice 111 in response to authorizing the first slice input and the first slice output. Likewise, wireless network slice 112 transfers the second slice input to wireless network slice 111. Wireless network slice 111 receives and authorizes the second slice input. Wireless network slice transfers the second acknowledgement to the wireless network slice 111 in response to authorizing the second slice input and the second slice output.

In some examples, wireless network slice 111 comprises a first Virtual Network Function (VNF) in a Network Function Virtualization Infrastructure (NFVI), and wireless network slice 112 comprises a second VNF in the NFVI. Wireless network slice 111 may comprise a user-plane VNF in an NFVI, and wireless network slice 112 may comprise a control-plane VNF in the NFVI. User-plane VNFs handle user data while control-plane VNFs use signaling to control the handling of the user data in the user-plane VNFs. Wireless network slice 111 may comprise a first VNF in a Network Function Virtualization Network Service Descriptor (NFV-NSD) in an NFVI, and wireless network slice 112 may comprise a second VNF in the NFV-NSD in the NFVI.

In some examples, wireless network slice 111 transfers the first slice output to wireless network slice 112 and receives the first acknowledgement from wireless network slice 112 over a Virtual Layer (VL) in an NFVI. Wireless network slice 112 may transfer the second slice output to wireless network slice 111 and receive the second acknowledgement from wireless network slice 111 over the VL in the NFVI. Wireless network slice 111 may transfer the first slice output to wireless network slice 112 and receives the first acknowledgement from wireless network slice 112 over a Virtual Network Function Forwarding Graph (VNF-FG) in an NFVI. Wireless network slice 112 may transfer the second slice output to wireless network slice 111 and receive the second acknowledgement from wireless network slice 111 over the VNF-FG in the NFVI.

Wireless communication system 100 comprises wireless access nodes, network controllers, data routers, and/or some other wireless communication apparatus. Wireless communication device 101 and wireless communication system 100 comprise one or more radios that wirelessly communicate using wireless protocols like Wireless Fidelity (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications.

Wireless communication device 101 and wireless network slices 111-112 comprise microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein.

Figure 2:
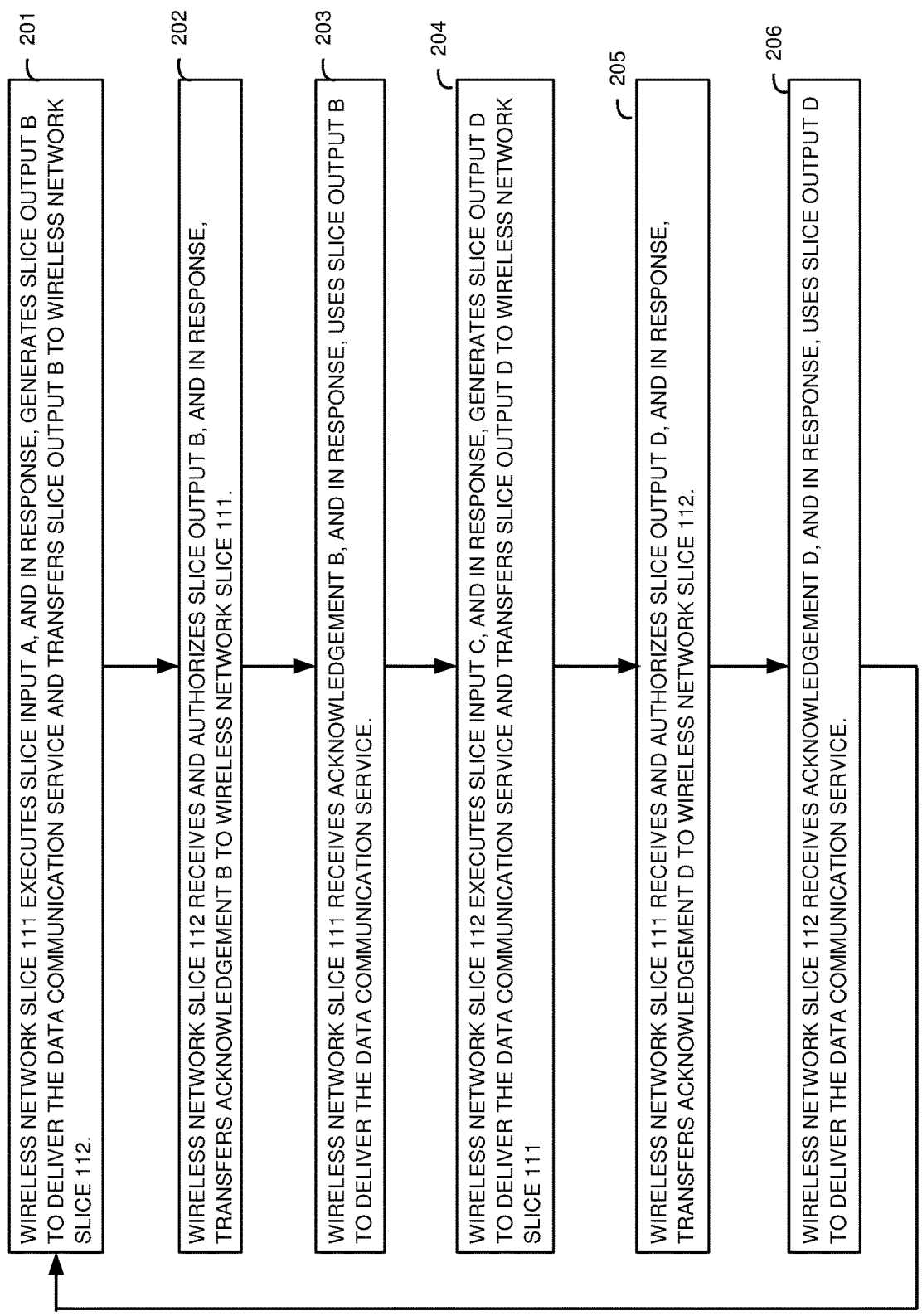
FIG. 2 illustrates an exemplary operation of the wireless communication system to deliver the data communication service using the synchronized wireless network slices.

FIG. 2 illustrates an exemplary operation of wireless communication system 100 to deliver the data communication service using synchronized wireless network slices 111-112. The operation may vary in other examples. Wireless network slice 111 executes slice input A, and in response, generates a slice output B to deliver the data communication service (201). Wireless network slice 111 transfers the slice output B to wireless network slice 112 (201). Wireless network slice 112 receives and authorizes the slice output B, and in response, transfers first acknowledgement B to wireless network slice 111 (202). Wireless network slice 111 receives acknowledgement B, and in response, uses the slice output B to deliver the data communication service to wireless communication device 101 (203). Wireless network slice 111 will not use slice output B for normal operations until the first acknowledgement is received.

Wireless network slice 112 executes slice input C, and in response, generates slice output D to deliver the data communication service (204). Wireless network slice 112 transfers the slice output D to wireless network slice 111 (204). Wireless network slice 111 receives and authorizes the slice output D, and in response, transfers acknowledgement D to wireless network slice 112 (205). Wireless network slice 112 receives acknowledgement D, and in response, uses slice output D to deliver the data communication service to wireless communication device 101 (206). Wireless network slice 112 will not use slice output D for normal operations until the second acknowledgement is received.

Slice inputs A and C and slice outputs B and D comprise user identifiers, user services, quality-of service levels, service usage information, digital certificates, or some other data that is generated and/or consumed by wireless network slices. Wireless network slices 111-112 perform their authorizations based on data structures of allowed and/or disallowed outputs, successful receipt, current status, authorization script, artificial intelligence, certificate validation, or some other techniques. Wireless network slices 111-112 can adjust their authorization decisions in response to changing conditions to ensure efficient and secure operation.

Figure 3:
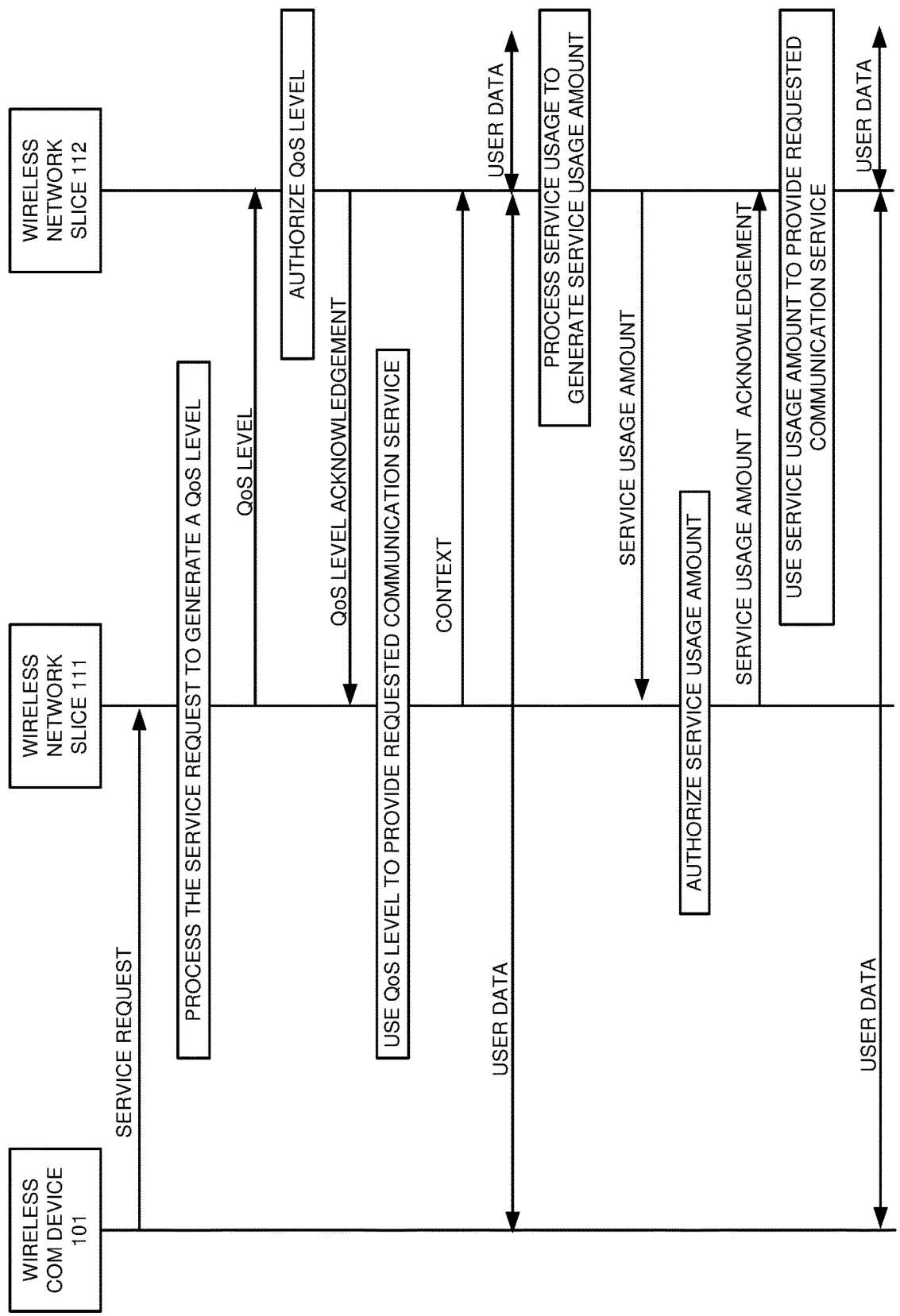
FIG. 3 illustrates an exemplary operation of the wireless communication system to deliver the data communication service using the synchronized wireless network slices.

FIG. 3 illustrates an exemplary operation of wireless communication system 100 to deliver the data communication service using synchronized wireless network slices 111-112. The operation may vary in other examples. Wireless communication device 101 transfers a service request to wireless network slice 111 which comprises a control-plane network function in this example. The service request is a slice input. To deliver the requested service, wireless network slice 111 executes the service request to generate a Quality-of-Service (QOS) level. The QoS level is a slice output. Wireless network slice 111 transfers the QoS level to wireless network slice 112. Wireless network slice 112 comprises a user-plane network function in this example. Wireless network slice 112 receives and authorizes the QoS level. In response, wireless network slice 112 transfers a QoS level acknowledgement to wireless network slice 111. Wireless network slice 111 receives the service QoS level acknowledgement, and in response, uses the QoS level to deliver the data communication service to wireless communication device 101. In particular, wireless network slice 111 transfers context to wireless network slice 112 that indicates the QoS level, network addresses, policies, and the like. In response to the context, wireless network slice 112 delivers the data communication service to wireless communication device 101. To use the data communication service, wireless communication device 101 exchanges user data with an external system (not shown) per the context over wireless network slice 112 under the control of wireless network slice 111.

Wireless network slice 112 monitors the data exchange to generate a service usage amount. The data exchange is a slice input, and the service usage amount is a slice output. Wireless network slice 112 transfers the service usage amount to wireless network slice 111. Wireless network slice 111 receives and authorizes the service usage amount. In response, wireless network slice 111 transfers a service usage amount acknowledgement to wireless network slice 112. Wireless network slice 112 receives the service usage amount acknowledgement, and in response, continues to deliver the data communication service to wireless communication device 101. Wireless communication device 101 continues to exchange user data with the external system (not shown) over wireless network slice 112 per the context under the control of wireless network slice 111.

Advantageously, wireless communication system 100 effectively synchronizes the parallel operations of network slices 112-113. Moreover, wireless communication system 100 may efficiently use NSDs and distributed ledgers to coordinate the parallel operations of the network slices 112-113. As a result, the delivery of data communication services to wireless communication device 101 is improved and protected.

Figure 4:
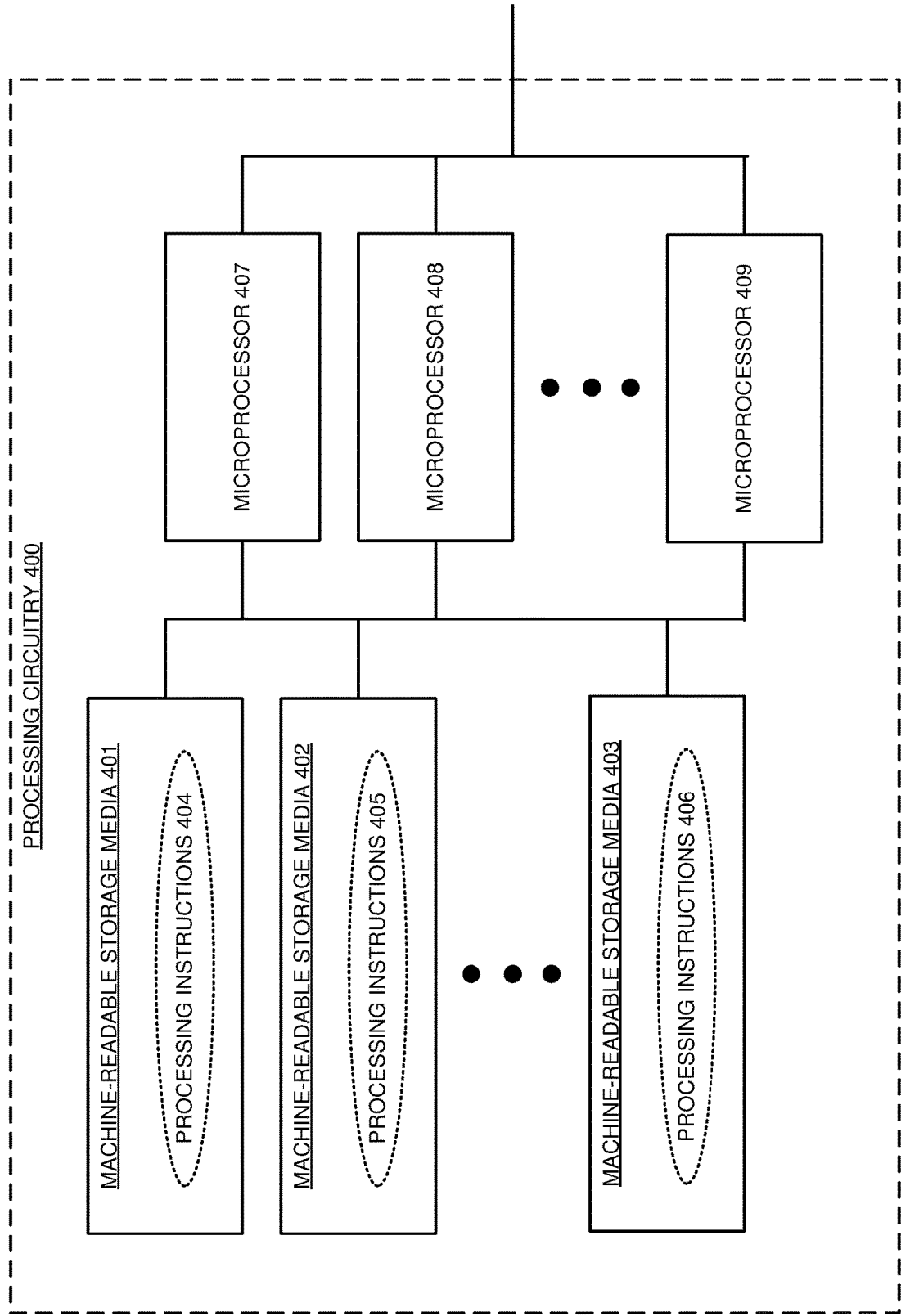
FIG. 4 illustrates exemplary processing circuitry to deliver a data communication service using synchronized wireless network slices.

FIG. 4 illustrates exemplary processing circuitry to deliver a data communication service using synchronized wireless network slicing. Processing circuitry 400 comprises an example of wireless network slices 111-112, although slices 111-112 may differ. Processing circuitry 400 comprises machine-readable storage media 401-403 and microprocessors 407-409 that are communicatively coupled. Machine-readable storage media 401-403 store processing instructions 404-406 in a non-transitory manner. Microprocessors 407-409 comprise DSPs, CPUs, GPUs, ASICs, and/or some other data processing hardware. Machine-readable storage media 401-403 comprises RAM, flash circuitry, disk drives, and/or some other type of data storage apparatus. Microprocessors 407-409 retrieve processing instructions 404-406 from non-transitory machine-readable storage media 401-403. Microprocessors 407-409 execute processing instructions 404-406 to deliver a data communication service to wireless communication devices using wireless network slices as described above for wireless communication system 100 and as described below for wireless communication network 500. The amount of storage media, microprocessors, processing instructions that are shown in FIG. 4 is exemplary and may vary in other examples.

Figure 5:
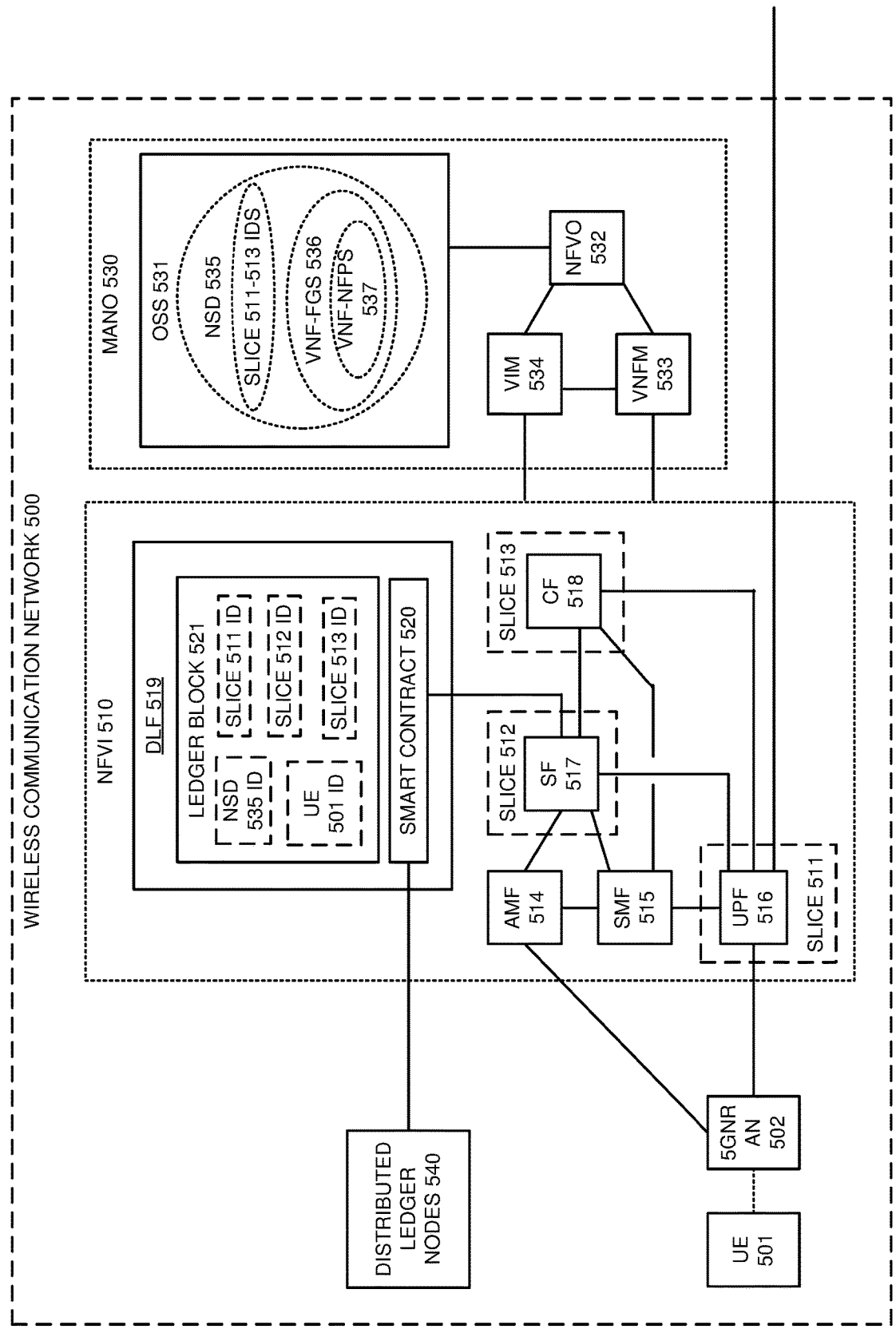
FIG. 5 illustrates an exemplary wireless communication network to deliver a data communication service using synchronized wireless network slices.

FIG. 5 illustrates exemplary wireless communication network 500 to deliver a data communication service using synchronized wireless network slices 511-513. Wireless communication network 500 comprises an example of wireless communication system 100 and processing circuitry 400, although system 100 and circuitry 400 may differ. Wireless communication network 500 comprises User Equipment (UE) 501, Fifth Generation New Radio Access Node (5GNR AN) 502, Network Function Virtualization Infrastructure (NFVI) 510, Management and Orchestration (MANO) 530, and distributed ledger nodes 540. NFVI 510 comprises wireless network slices 511-513, Access and Mobility Management Function (AMF) 514, Session Management Function (SMF) 515, and Distributed Ledger Function (DLF) 519. Slice 511 comprises User Plane Function (UPF) 516. Slice 512 comprises Security Function (SF) 517. Slice 513 comprises Cybernetic Function (CF) 518. DLF 519 comprises smart contract 520 and ledger block 521. MANO 530 comprises Operational Support System (OSS) 531, Network Function Virtualization Orchestrator (NFVO) 532, Virtual Network Function Manager (VNFM) 533, and Virtual Infrastructure Manager (VIM) 534. OSS 531 comprises Network Service Diagram (NSD) 535 that comprises slice IDs 511-513 and Virtual Network Function Forwarding Graphs (VNF-FGs) 536. VNF-FGs 536 comprise Virtual Network Function Network Forwarding Paths (VNF-NFPs) 537. MANO ledger block 521 eventually stores Identifiers (IDs) for slices 511-513, NSD 535, and UE 501 as described below.

In slice 511, UPF 516 exchanges user data between ANs like 5GNR AN 502 and external systems like the internet. UPF 516 applies Quality-of-Service (QOS) and Network Address Translation (NAT) to the user data exchange in response to signaling from SMF 515. For example, UPF 516 may exchange the user data based on data rate and latency parameters in signaling from SMF 515. In slice 512, SF 517 performs security tasks like verifying UEs, ANs, network addresses, QoS, and the like against expected and allowed data. For example, SF 517 may validate digital certificates from UE 501, 5GNR AN 502, and UPF 516 to protect the integrity of the data session. In slice 513, CF 518 monitors data sessions for modifications to UEs, ANs, and UPFs. For example, CF 518 may direct UE 501 and 5GNR 502 (over SMF 515 and AMF 514) to use a different form of data encoding, encryption, or error correction.

Slices 511-513 exchange peer-to-peer signaling to synchronize their parallel operations. Slices 511-513 process data inputs to generate data outputs to perform their functions. Slices 511-513 share at least some of these data outputs with one another over the peer-to-peer signaling. Slices 511-513 authorize and acknowledge the shared data outputs of the other slices over the peer-to-peer signaling. The authorizations may be based on data receipt, data structures that indicate acceptable outputs, certificate validation, artificial intelligence, code scripts, or some other technique. Slices 511-513 may use the shared data outputs for their own operations. When a slice output is not properly acknowledged, slices 511-513 stop normal operations and take remedial action like generating an alarm, modifying a service, isolating a device, or performing some other process.

In MANO 530, OSS 531 launches NSD 535 through NFVO 532. In response, NFVO 532 directs VNFM 533 and VIM 534 to instantiate slices 511-513, VNF-FGs 536, and VNF-NFPs 537 in NFVI 510. VIM 534 establishes an execution environment, VNF-FGs 536, and VNF-NFPs 537 in NFVI 510. VNF-FGs 536 specify VNF-NFPs 537 that connect UPF 516, SF 517, and CF 518 with one another. VNFM 533 manages UPF 516, SF 517, and CF 518 in NFVI 510.

UE 501 registers with AMF 514 over 5GNR AN 502. The registration indicates a slice capability for slices 511-513 by slice ID or slice type. AMF 514 authenticates UE 501 and selects slices 511-513 for UE 501. AMF 514 directs SMF 515 to manage sessions for UE 501 over slices 511-513. AMF 514 and SMF 515 develop UE context for UE 501 like authorized connections along with their Quality-of-Service (QOS) and network addresses. AMF 514 transfers some of the UE context to UE 501, 5GNR AN 502, and SMF 515. SMF 515 transfers some of the UE context to UPF 516, SF 517, and CF 518. In response to the context, UE 501 exchanges user data with external systems (not shown) over 5GNR AN 502 and UPF 516.

SF 517 validate digital certificates for UE 501, 5GNR AN 502, and UPF 516 that were gathered by AMF 514 and SMF 515. SF 517 indicates the session data to smart contract 520 including IDs for slices 511-513, NSD 535, and UE 501. Smart contract 520 obtains consensus for this transaction with distributed ledger nodes 540. In response to the consensus, smart contract 520 stores the IDs for slices 511-513, NSD 535, and UE 501 in ledger block 521 using a blockchain format.

UPF 516 processes various data inputs to generate data outputs that characterize the data sessions like network addresses, data amount, and data rate. UPF 516 transfers the data outputs to SF 517. SF 517 authorizes these data outputs by comparing the network addresses, data amount, data rate to the UE context or possibly other data. SF 517 transfers an Acknowledgement (ACK) to UPF 516 based on the authorization. UPF 516 continues to serve UE 501 based on the UE context and data outputs in response to the ACK.

SF 517 processes the data outputs from UPF 516 as data inputs against security parameters to generate other data outputs like security status. SF 517 transfers the security status to UPF 516 and CF 518 for authorization. UPF 516 and CF 518 authorize the security status and return ACKs to SF 517. SF 517 uses the security status to deliver the data communication service in response to the ACKs. For example, SF 517 may generate security alarms and stop data sessions when UE 501 is using an improper destination address for the user data.

UPF 516 and SF 517 transfer session data to CF 518. CF 518 authorizes the session data by comparing the session data to expected session data and determines session modifications based on the comparisons. CF 518 transfers ACKs to UPF 516 and SMF 517 based on the authorizations. UPF 516 and SF 517 continue to serve UE 501 based on the session data in response to the ACKs. CF 518 processes the session data as data inputs to determine data outputs that comprises modifications for UE 501 like using a different version of a user application, network protocol, or operating system. CF 518 transfers the modifications to UPF 516 and SF 517. UPF 516 and SF 517 authorize the modifications and transfer ACKs to CF 518. CF 518 implements the modifications for UE 501 in response to the ACKs.

Figure 6:
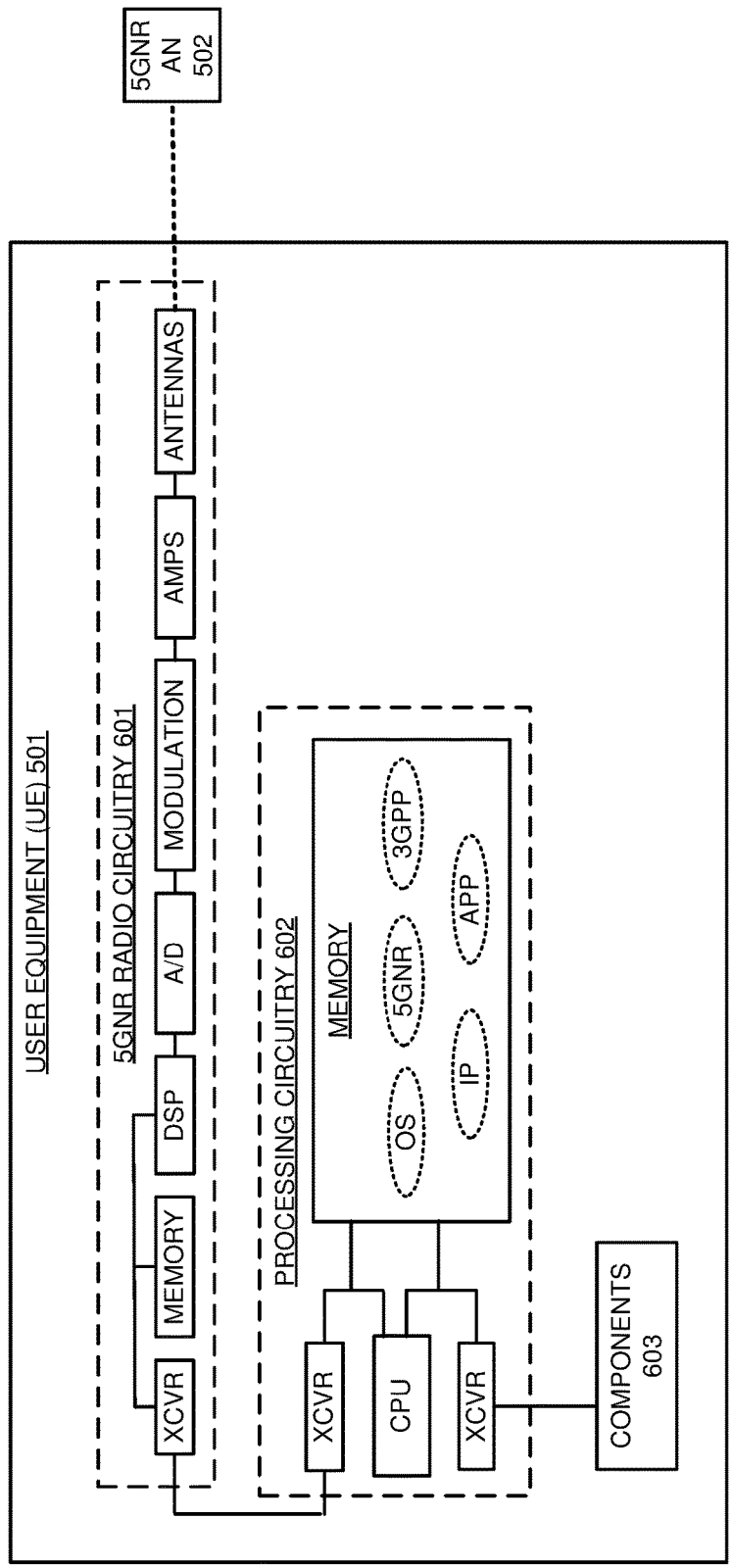
FIG. 6 illustrates an exemplary UE in the wireless communication network that delivers the data communication service using the synchronized wireless network slices.

FIG. 6 illustrates exemplary UE 501 in wireless communication network 500 that delivers the data communication service using synchronized wireless network slices 511-513. UE 501 comprises an example of wireless communication device 101, although device 101 may differ. UE 501 comprises Fifth Generation New Radio (5GNR) radio circuitry 601, processing circuitry 602, and components 603. 5GNR radio circuitry 601 comprises antennas, amplifiers, filters, modulation, analog-to-digital interfaces, DSPs, memories, and transceivers (XCVRs) that are coupled over bus circuitry. Processing circuitry 602 comprises one or more CPUs, one or more memories, and one or more transceivers that are coupled over bus circuitry. Components 603 comprise sensors, cameras, medical devices, and/or some other user apparatus. The one or more memories in processing circuitry 602 store software like an Operating System (OS), 5GNR application (5GNR), 3GPP application (3GPP), Internet Protocol application (IP), and user application (APP). The antennas in 5GNR radio circuitry 601 exchange 5GNR signals with 5GNR AN 502. Transceivers in 5GNR radio circuitry 601 are coupled to transceivers in processing circuitry 602. In processing circuitry 602, the one or more CPUs retrieve the software from the one or more memories and execute the software to direct the operation of UE 501 as described herein.

Figure 7:
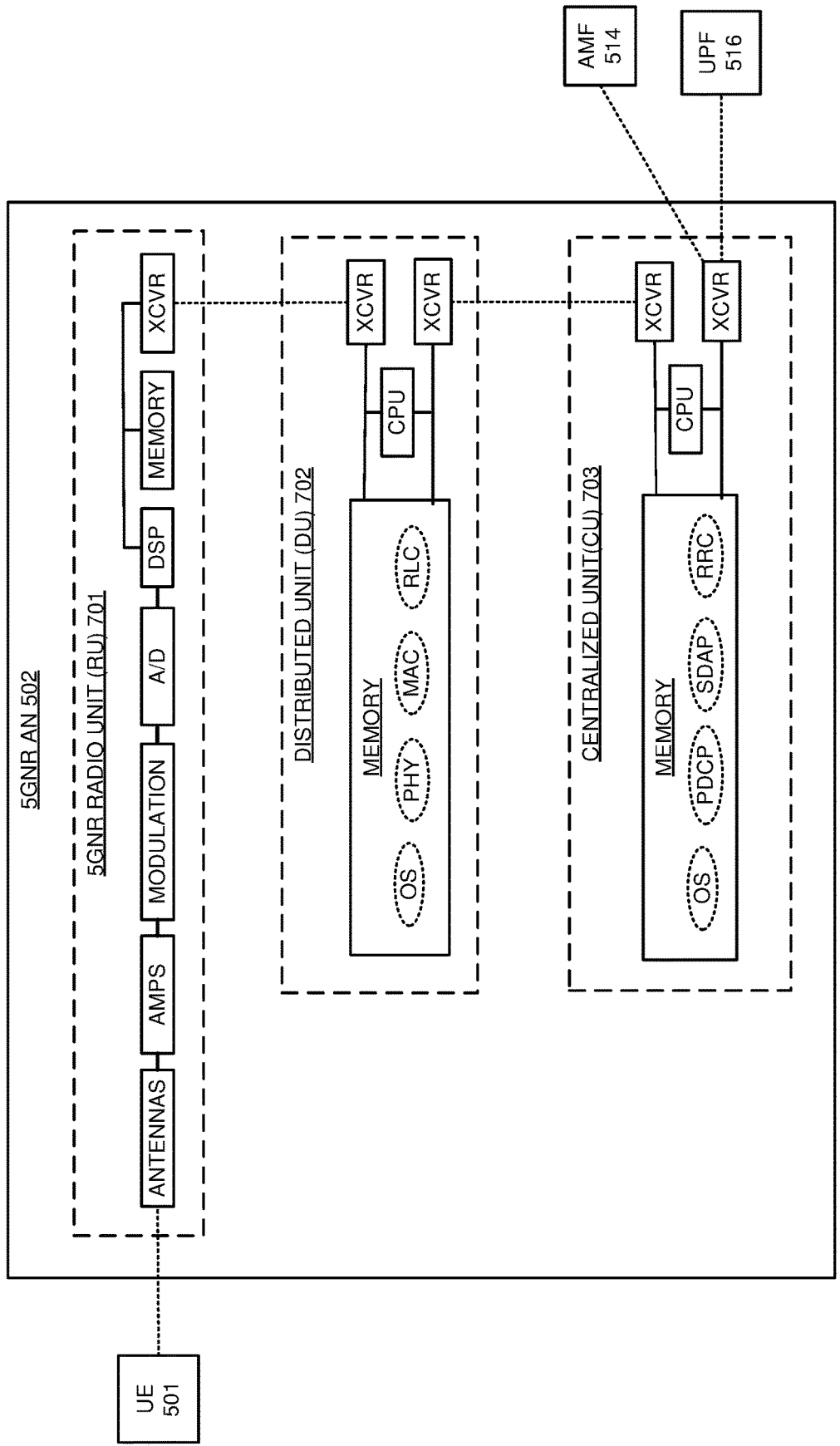
FIG. 7 illustrates an exemplary Fifth Generation New Radio (5GNR) access node in the wireless communication network that delivers the data communication service using the synchronized wireless network slices.

FIG. 7 illustrates exemplary Fifth Generation New Radio Access Node (5GNR AN) 502 in wireless communication network 500 that delivers the data communication service using wireless network slices 511-513. 5GNR AN 502 comprises an example of wireless communication system 100 and processing circuitry 400, although system 100 and circuitry 400 may differ. 5GNR AN 502 comprises 5GNR Radio Unit (RU) 701, Distributed Unit (DU) 702, and Centralized Unit (CU) 703. 5GNR RU 701 comprises antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for Physical Layer (PHY), Media Access Control (MAC), and Radio Link Control (RLC). CU 703 comprises memory, CPU, and transceivers that are coupled over bus circuitry. The memory in CU 703 stores an operating system and 5GNR network applications for Packet Data Convergence Protocol (PDCP), Service Data Adaption Protocol (SDAP), and Radio Resource Control (RRC). The antennas in 5GNR RU 701 are wirelessly coupled to UE 501 over 5GNR links. Transceivers in 5GNR RU 701 are coupled to transceivers in DU 702. Transceivers in DU 702 are coupled to transceivers in CU 703. Transceivers in CU 703 are coupled to AMF 514 and UPF 516. The DSP and CPU in RU 701, DU 702, and CU 703 execute the radio applications, operating systems, and network applications to exchange data and signaling with UE 501, AMF 514, and UPF 516 as described herein.

Figure 8:
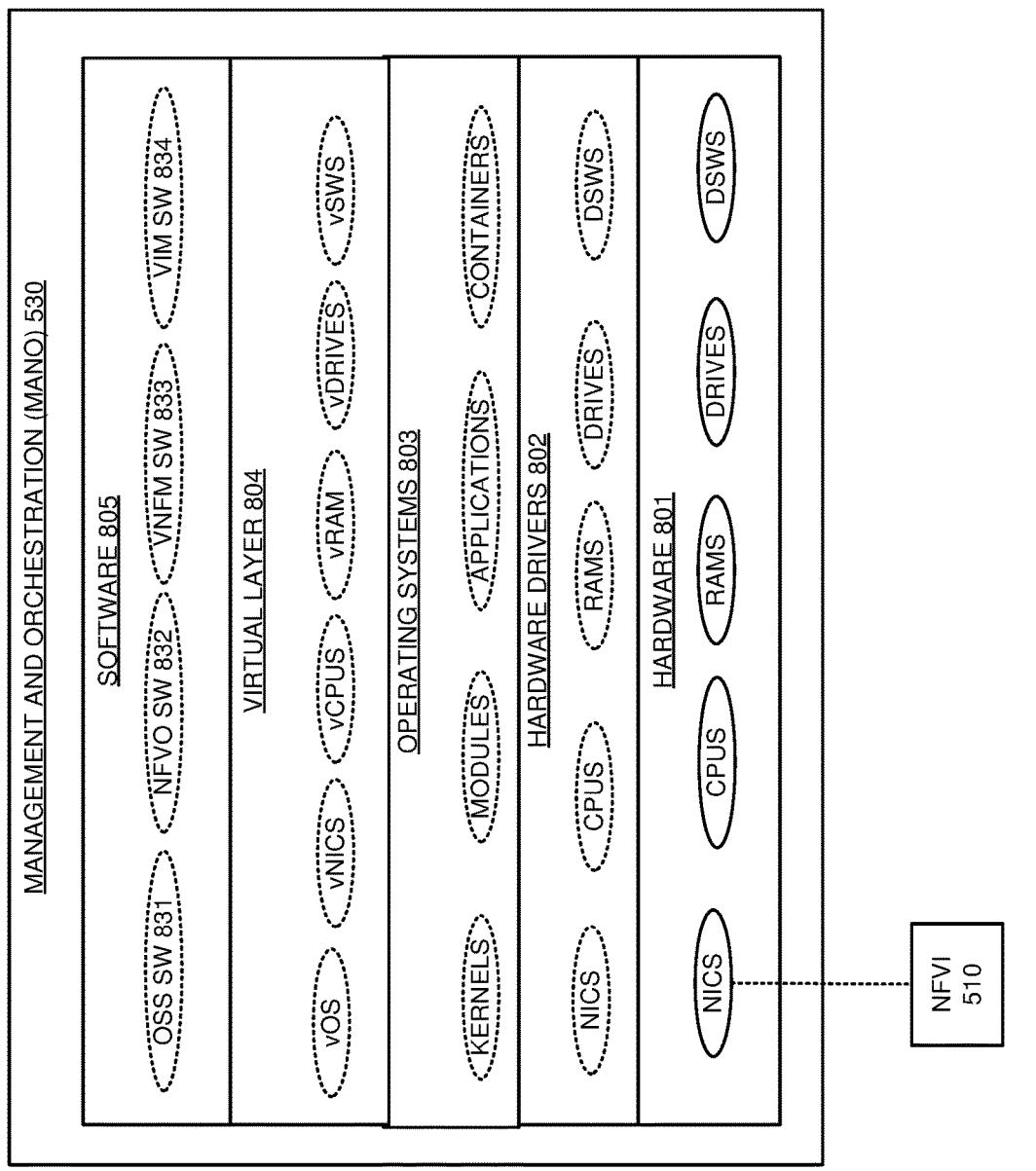
FIG. 8 illustrates an exemplary Management and Orchestration (MANO) system in the wireless communication network that delivers the data communication service using the synchronized wireless network slices.

FIG. 8 illustrates exemplary Management and Orchestration (MANO) 530 in wireless communication network 500 that delivers the data communication service using synchronized wireless network slices 511-513. MANO 530 comprises an example of wireless communication system 100 and processing circuitry 400, although system 100 and circuitry 400 may differ. MANO 530 comprises hardware 801, hardware drivers 802, operating systems 803, virtual layer 804, and Software (SW) 805. Hardware 801 comprises Network Interface Cards (NICs), CPU, RAM, Flash/Disk Drives (DRIVE), and Data Switches (DSW). Hardware drivers 802 comprise software that is resident in the NIC, CPU, RAM, DRIVE, and DSW. Operating systems 803 comprise kernels, modules, applications, and containers. Virtual layer 804 comprises vNIC, vCPU, vRAM, vDRIVE, and vSW. SW 805 comprises OSS SW 831, NFVO SW 832, VNFM SW 833, and VIM SW 834. The NIC in NF hardware 801 are coupled to NFVI 510. Hardware 801 executes hardware drivers 802, operating systems 803, virtual layer 804, and SW 805 to form and operate OSS 531, NFVO 532, VNFM 533, and VIM 534. Thus, MANO 530 comprises one or more microprocessors and one or more non-transitory machine-readable storage media that store processing instructions that direct MANO 530 to perform the methods described herein. MANO 530 may be located at a single site or be distributed across multiple geographic locations.

Figure 9:
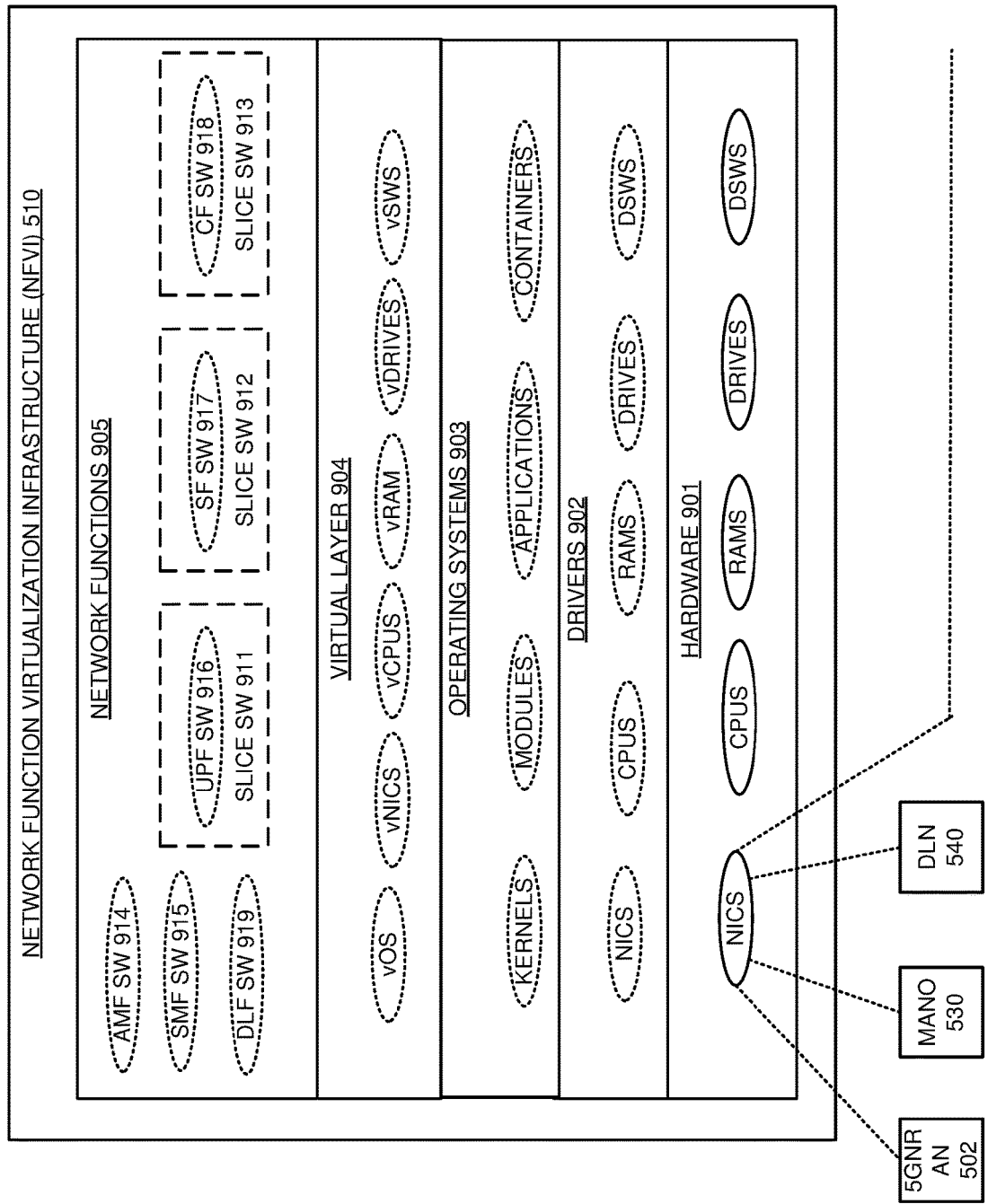
FIG. 9 illustrates an exemplary Network Function Virtualization Infrastructure (NFVI) in the wireless communication network that delivers the data communication service using the synchronized wireless network slices.

FIG. 9 illustrates exemplary Network Function Virtualization Infrastructure (NFVI) 510 in wireless communication network 500 that delivers the data communication service using synchronized wireless network slices 511-513. NFVI 510 comprises an example of wireless communication system 100, slices 111-112, and processing circuitry 400, although system 100, slices 111-112, and circuitry 400 may differ. NFVI 510 comprises hardware 901, hardware drivers 902, operating systems 903, virtual layer 904, and SW 905. Hardware 901 comprises NICs, CPU, RAM, DRIVE, and DSW. Hardware drivers 902 comprise software that is resident in the NIC, CPU, RAM, DRIVE, and DSW. Operating systems 903 comprise kernels, modules, applications, and containers. Virtual layer 904 comprises vNIC, vCPU, vRAM, vDRIVE, and vSW. SW 905 comprises AMF SW 914, SMF SW 915, slice SW 911-913, and Distributed Ledger Function (DLF) SW 919. Slice SW 911 comprises UPF SW 916 for slice 511. Slice SW 912 comprises SF SW 917 for slice 511. Slice SW 913 comprises CF SW 918 for slice 513. The NIC in hardware 901 are coupled to 5GNR AN 502, MANO 530, Distributed Ledger Nodes (DLN) 540, and external systems. Hardware 901 executes hardware drivers 902, operating systems 903, virtual layer 904, and SW 905 to form and operate AMF 514, SMF 515, slice 511 including UPF 511, slice 512 including SF 512, slice 513 including CF 513, and DLF 519. NFVI 510 comprises one or more microprocessors and one or more non-transitory machine-readable storage media that store processing instructions that direct NFVI 510 to perform the methods described herein. NFVI 510 may be located at a single site or be distributed across multiple geographic locations.

Figure 10:
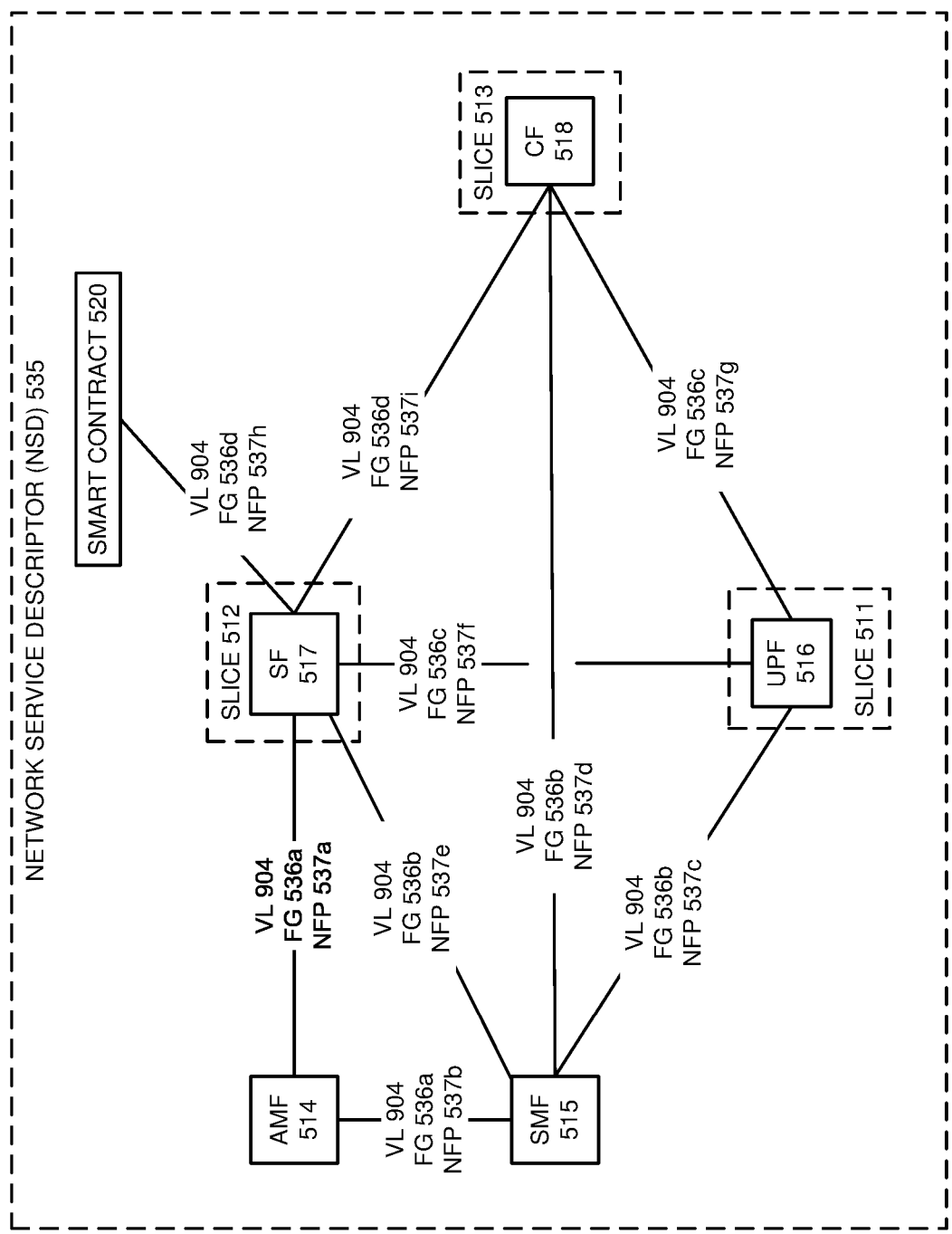
FIG. 10 illustrates an exemplary Network Services Descriptor (NSD) in the wireless communication network that delivers the data communication service using the synchronized wireless network slices.

FIG. 10 illustrates exemplary Network Services Descriptor (NSD) 535 in wireless communication network 500 that delivers the data communication service using synchronized wireless network slices 511-513. NSD 535 is implemented in NFVI 510 at the direction of MANO 530. In NSD 535, AMF 514 is coupled to SF 517 in slice 512 over VNF Network Function Path (NFP) 537a that is in VNF Forwarding Group (FG) 536a which is in Virtual Layer (VL) 904. AMF 514 is coupled to SMF 515 over NFP 537b that is in FG 536a which is in VL 904. SMF 515 is coupled to UPF 516 in slice 511 over NFP 537c that is in FG 536b which is in VL 904. SMF 515 is coupled to CF 518 in slice 513 over NFP 537d that is in FG 536b which is in VL 904. SMF 515 is coupled to SF 517 in slice 512 over NFP 537e that is in FG 536b which is in VL 904. UPF 516 in slice 511 is coupled to SF 517 in slice 512 over NFP 537f that is in FG 536c which is in VL 904. UPF 516 in slice 511 is coupled to CF 518 in slice 513 over NFP 537g that is in FG 536c which is in VL 904. SF 517 in slice 512 is coupled to smart contract 520 over NFP 537h that is in FG 536d which is in VL 904. SF 517 in slice 512 is coupled to CF 518 in slice 513 over NFP 537i that is in FG 536d which is in VL 904.

Figure 11:
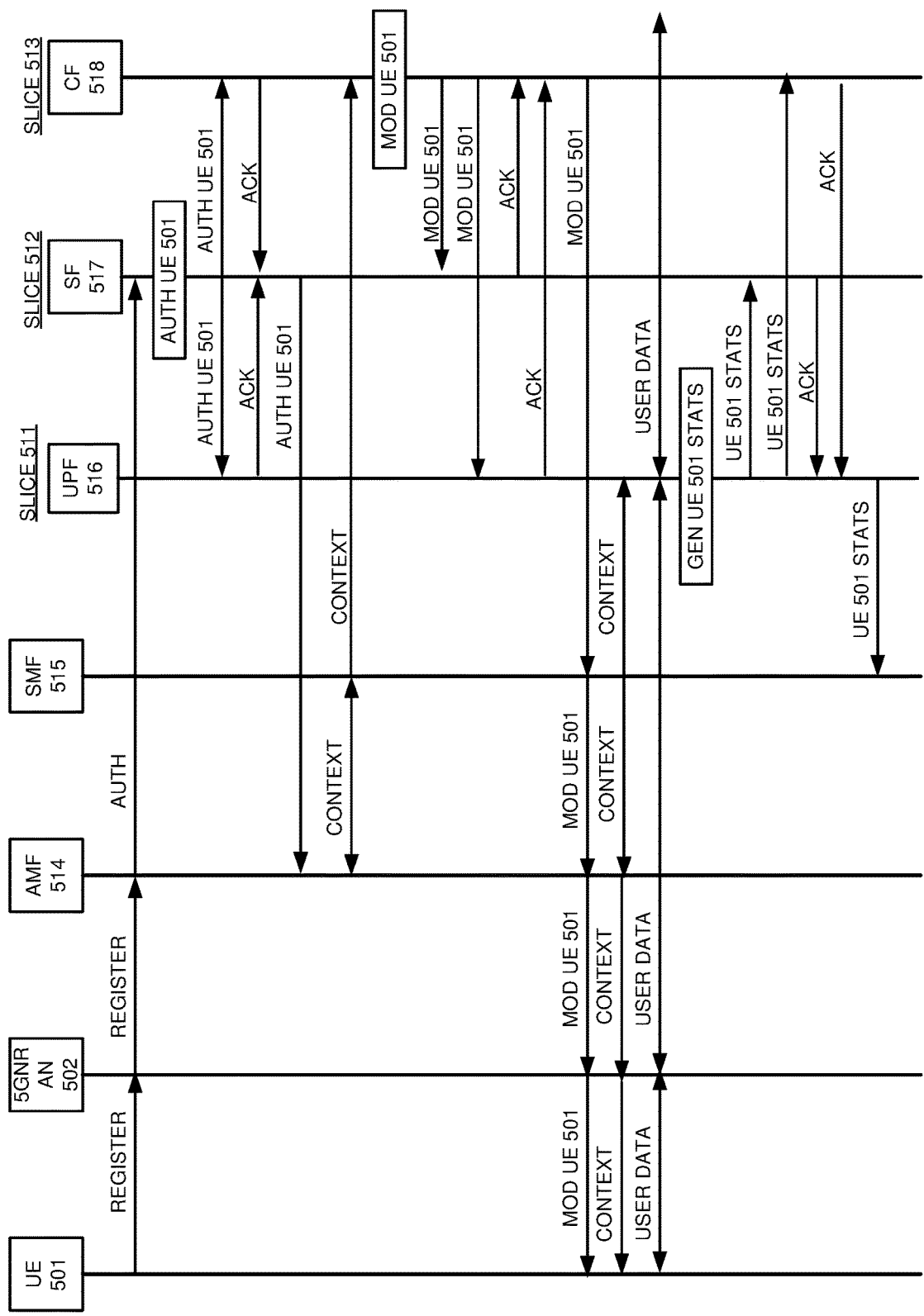
FIG. 11 illustrates an exemplary operation of the wireless communication network to deliver the data communication service using the synchronized wireless network slices.

FIG. 11 illustrates an exemplary operation of wireless communication network 500 to deliver the data communication service using synchronized wireless network slices 511-513. The operation may vary in other examples. In this example, slices 511-513 authorize the shared data outputs based on their successful receipt along with the validation of an accompanying digital certificate. For example, CF 518 authorizes data outputs from SF 517 in response to their successful receipt of the data outputs and the validation of the accompanying digital certificate for SF 517.

UE 501 registers with AMF 514 over 5GNR AN 502 using a UE certificate and indicating slice 512. Based on the slice indication, AMF 514 transfers the UE certificate to SF 517 in slice 512 for authentication (AUTH). SF 517 validates the UE certificate to authenticate UE 501. SF 517 indicates to UPF 516 and CF 518 that UE 501 is authenticated and includes its own SF certificate. UPF 516 and CF 518 authorize the authentication based on successful receipt of the data output and validation of the SF certificate. UPF 516 and CF 518 transfer ACKs and their own certificates to SF 517 in response to the authorization. UPF 516 and CF 518 may also use this data output for their own operations. SF 517 validates the certificates and processes the ACKs which indicates that the parallel operations of slices 511-513 are synchronized. In response, SF 517 indicates to AMF 514 that UE 501 is authenticated.

In response to the authentication, AMF 514 and SMF 515 develop context for UE 501 like slices, connections, QoS, policies, and the like. SMF 515 transfers the context to CF 518 for analysis. CF 515 processes the context for UE 501 to determine a modification (MOD) for UE 501. In this example, the modification is a different type of wireless data encoding than the encoding indicated by the context. CF 518 transfers the UE modification to UPF 516 and SF 517 along with its CF certificate. UPF 516 and SF 517 authorize this data output based on successful receipt of the data output and validation of the CF certificate. UPF 516 and SF 517 may also use this data output for their own operations. UPF 516 and SF 517 return ACKs and their certificates to CF 518. CF 518 validates the certificates and processes the ACKs which indicates that the parallel operations of slices 511-513 are synchronized. In response, CF 518 directs SMF 515 to modify UE 501 to use the different wireless data encoding. SMF 515 indicates the UE modification to AMF 514, and AMF 514 directs UE 501 and 5GNR AN 502 to use the different wireless data encoding.

UE 501 and an external data system (not shown) exchange user data over 5GNR AN 502 and UPF 516 per the UE context—although UE 501 and 5GNR AN 502 do use the different wireless data encoding selected by CF 518. UPF 516 generates statistics (STATS) for the data session like data amount, data rate, latency, error rate, addresses, and the like. UPF 516 transfers the statistics for UE 501 to SF 517 and CF 518 along with its UPF certificate. SF 517 and CF 518 authorize this data output based on successful receipt of the data output and validation of the UPF certificate. SF 517 and CF 518 may also use this data output for their own operations. SF 517 and CF 518 return ACKs and their certificates to UPF 516. UPF 516 validates the certificates and processes the ACKs which indicates that the parallel operations of slices 511-513 are synchronized. In response, UPF 516 transfers the UE 501 statistics to SMF 515 to use for session management.

The wireless communication system circuitry described above comprises computer hardware and software that form special-purpose data communication circuitry to deliver a data communication service using synchronized wireless network slicing. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to deliver a data communication service using synchronized wireless network slicing.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to deliver a data communication service using synchronized wireless network slicing, the method comprising:
   a first wireless network slice executing a first slice input, and in response, generating a first slice output to deliver the data communication service and transferring the first slice output to a second wireless network slice;
   the second wireless network slice receiving and authorizing the first slice output, and in response, transferring a first acknowledgement to the first wireless network slice;
   the first wireless network slice receiving the first acknowledgement, and in response, using the first slice output to deliver the data communication service;
   the second wireless network slice executing a second slice input, and in response, generating a second slice output to deliver the data communication service and transferring the second slice output to the first wireless network slice;
   the first wireless network slice receiving and authorizing the second slice output, and in response, transferring a second acknowledgement to the second wireless network slice; and
   the second wireless network slice receiving the second acknowledgement, and in response, using the second slice output to deliver the data communication service.

2. The method of claim 1 further comprising:
   the first wireless network slice transferring the first slice input to the second wireless network slice;
   the second wireless network slice receiving and authorizing the first slice input wherein the second wireless network slice transferring the first acknowledgement to the first wireless network slice comprises transferring the first acknowledgement to the first wireless network slice in response to authorizing the first slice input and the first slice output;

the second wireless network slice transferring the second slice input to the first wireless network slice; and
the first wireless network slice receiving and authorizing the second slice input wherein the first wireless network slice transferring the second acknowledgement to the second wireless network slice comprises transferring the second acknowledgement to the second wireless network slice in response to authorizing the second slice input and the second slice output.

3. The method of claim 1 wherein:
the first wireless network slice comprises a first Virtual Network Function (VNF) in a Network Function Virtualization Infrastructure (NFVI); and
the second wireless network slice comprises a second VNF in the NFVI.

4. The method of claim 1 wherein:
the first wireless network slice comprises a user-plane Virtual Network Function (VNF) in a Network Function Virtualization Infrastructure (NFVI); and
the second wireless network slice comprises a control-plane VNF in the NFVI.

5. The method of claim 1 wherein:
the first wireless network slice comprises a first Virtual Network Function (VNF) in a Network Function Virtualization Network Service Descriptor (NFV-NSD) in a Network Function Virtualization Infrastructure (NFVI); and
the second wireless network slice comprises a second VNF in the NFV-NSD in the NFVI.

6. The method of claim 1 wherein:
the first wireless network slice transferring the first slice output to the second wireless network slice and receiving the first acknowledgement transferred by the second wireless network slice comprises transferring the first slice output and receiving the first acknowledgement over a virtual layer in a Network Function Virtualization Infrastructure (NFVI); and
the second wireless network slice transferring the second slice output to the first wireless network slice and receiving the second acknowledgement transferred by the first wireless network slice comprises transferring the second slice output and receiving the second acknowledgement over the virtual layer in the NFVI.

7. The method of claim 1 wherein:
the first wireless network slice transferring the first slice output to the second wireless network slice and receiving the first acknowledgement transferred by the second wireless network slice comprises transferring the first slice output and receiving the first acknowledgement over a Virtual Network Function Forwarding Graph (VNF-FG) in a Network Function Virtualization Infrastructure (NFVI); and
the second wireless network slice transferring the second slice output to the first wireless network slice and receiving the second acknowledgement transferred by the first wireless network slice comprises transferring the second slice output and receiving the second acknowledgement over the VNF-FG in the NFVI.

8. A method of operating a Network Function Virtualization Infrastructure (NFVI) to deliver a data communication service using wireless network slicing, the method comprising:
a first Wireless Network Slice Virtual Network Function (WNS-VNF) executing a first slice input, and in response, generating a first slice output to deliver the data communication service and transferring the first slice output to a second WNS-VNF over an NFVI-Virtual Layer (VL);
the second WNS-VNF receiving and authorizing the first slice output, and in response, transferring a first acknowledgement to the first WNS-VNF over the NFVI-VL;
the first WNS-VNF receiving the first acknowledgement, and in response, using the first slice output to deliver the data communication service;
the second WNS-VNF executing a second slice input, and in response, generating a second slice output to deliver the data communication service and transferring the second slice output to the first WNS-VNF over the NFVI-VL;
the first WNS-VNF receiving and authorizing the second slice output, and in response, transferring a second acknowledgement to the second WNS-VNF over the NFVI-VL; and
the second WNS-VNF receiving the second acknowledgement, and in response, using the second slice output to deliver the data communication service.

9. The method of claim 8 further comprising:
the first WNS-VNF transferring the first slice input to the second wireless network slice over the NFVI-VL;
the second WNS-VNF receiving and authorizing the first slice input wherein the second WNS-VNF transferring the first acknowledgement to the first WNS-VNF over the NFVI-VL comprises transferring the first acknowledgement to the first WNS-VNF in response to authorizing the first slice input and the first slice output;
the second WNS-VNF transferring the second slice input to the first wireless network slice over the NFVI VL; and
the first WNS-VNF receiving and authorizing the second slice input wherein the first WNS-VNF transferring the second acknowledgement to the second WNS-VNF over the NFVI-VL comprises transferring the second acknowledgement to the second WNS-VNF in response to authorizing the second slice input and the second slice output.

10. The method of claim 8 wherein:
the first WNS-VNF comprises a user-plane WNS-VNF; and
the second WNS-VNF comprises a control-plane WNS-VNF.

11. The method of claim 8 wherein:
the first WNS-VNF comprises a first WNS-VNF in an NFVI-Network Service Descriptor (NFVI-NSD); and
the second WNS-VNF comprises a second WNS-VNF in the NFVI-NSD.

12. The method of claim 8 wherein the NFVI-VL comprises NFVI Virtual Network Function Network Forwarding Paths (NFVI VNF-NFPs) in an NFVI-Network Service Descriptor (NFVI-NSD).

13. The method of claim 8 wherein the NFVI-VL comprises an NFVI Virtual Network Function Forwarding Graph (NFVI VNF-FG) in an NFVI-Network Service Descriptor (NFVI-NSD).

14. A wireless communication system to deliver a data communication service using synchronized wireless network slicing, the wireless communication system comprising:
one or more processors to execute a first wireless network slice and a second wireless network slice;
the first wireless network slice to execute a first slice input, and in response, to generate a first slice output to deliver the data communication service and transfer the first slice output to the second wireless network slice;

the second wireless network slice to receive and authorize the first slice output, and in response, to transfer a first acknowledgement to the first wireless network slice;

the first wireless network slice to receive the first acknowledgement, and in response, to use the first slice output to deliver the data communication service;

the second wireless network slice to execute a second slice input, and in response, to generate a second slice output to deliver the data communication service and transfer the second slice output to the first wireless network slice;

the first wireless network slice to receive and authorize the second slice output, and in response, to transfer a second acknowledgement to the second wireless network slice; and the second wireless network slice to receive the second acknowledgement, and in response, to use the second slice output to deliver the data communication service.

15. The wireless communication system of claim 14 further comprising:

the first wireless network slice to transfer the first slice input to the second wireless network slice;

the second wireless network slice to receive and authorize the first slice input wherein the second wireless network slice is to transfer the first acknowledgement to the first wireless network slice in response to authorizing the first slice input and the first slice output;

the second wireless network slice is to transfer the second slice input to the first wireless network slice; and the first wireless network slice is to receive and authorize the second slice input wherein the first wireless network slice is to transfer the second acknowledgement to the second wireless network slice in response to authorizing the second slice input and the second slice output.

16. The wireless communication system of claim 14 wherein:

the first wireless network slice comprises a first Virtual Network Function (VNF) in a Network Function Virtualization Infrastructure (NFVI); and the second wireless network slice comprises a second VNF in the NFVI.

17. The wireless communication system of claim 14 wherein:

the first wireless network slice comprises a user-plane Virtual Network Function (VNF) in a Network Function Virtualization Infrastructure (NFVI); and the second wireless network slice comprises a control-plane VNF in the NFVI.

18. The wireless communication system of claim 14 wherein:

the first wireless network slice comprises a first Virtual Network Function (VNF) in a Network Function Virtualization Network Service Descriptor (NFV-NSD) in a Network Function Virtualization Infrastructure (NFVI); and the second wireless network slice comprises a second VNF in the NFV-NSD in the NFVI.

19. The wireless communication system of claim 14 wherein:

the first wireless network slice is to transfer the first slice output to the second wireless network slice and receiving the first acknowledgement transferred by the second wireless network slice over a virtual layer in a Network Function Virtualization Infrastructure (NFVI); and the second wireless network slice is to transfer the second slice output to the first wireless network slice and receive the second acknowledgement transferred by the first wireless network slice over the virtual layer in the NFVI.

20. The wireless communication system of claim 14 wherein:

the first wireless network slice is to transfer the first slice output to the second wireless network slice and receive the first acknowledgement transferred by the second wireless network slice over a Virtual Network Function Forwarding Graph (VNF-FG) in a Network Function Virtualization Infrastructure (NFVI); and the second wireless network slice is to transfer the second slice output to the first wireless network slice and receive the second acknowledgement transferred by the first wireless network slice over the VNF-FG in the NFVI.

* * * * *